(12) United States Patent
Rothbucher

(10) Patent No.: US 9,417,063 B2
(45) Date of Patent: Aug. 16, 2016

(54) SURVEYING PRISM

(71) Applicant: Georg Rothbucher, Bayerisch Gmain (DE)

(72) Inventor: Georg Rothbucher, Bayerisch Gmain (DE)

( * ) Notice: Subject to any disclaimer, the term of this patent is extended or adjusted under 35 U.S.C. 154(b) by 177 days.

(21) Appl. No.: 14/244,203

(22) Filed: Apr. 3, 2014

(65) Prior Publication Data

US 2014/0325856 A1    Nov. 6, 2014

(30) Foreign Application Priority Data

May 3, 2013   (DE) .................... 20 2013 101 924 U

(51) Int. Cl.
| | | |
|---|---|---|
| *G01C 15/06* | (2006.01) | |
| *G01C 15/02* | (2006.01) | |
| *G01C 15/00* | (2006.01) | |

(52) U.S. Cl.
CPC ............ *G01C 15/06* (2013.01); *G01C 15/00* (2013.01); *G01C 15/02* (2013.01)

(58) Field of Classification Search
CPC ........ G01C 15/06; G01C 15/02; G01C 15/00; G01C 15/002; G01C 15/006
USPC .................................................... 33/293, 295
See application file for complete search history.

(56) References Cited

U.S. PATENT DOCUMENTS

| | | | | |
|---|---|---|---|---|
| 4,519,674 A * | 5/1985 | Buckley | ................. | G01C 15/02 33/293 |
| 4,875,291 A * | 10/1989 | Panique | ............... | G02B 7/1805 33/293 |
| 4,898,452 A * | 2/1990 | Kawachi | ................ | G01C 15/02 33/293 |
| 5,204,731 A * | 4/1993 | Tanaka | ................... | G01C 15/00 356/141.1 |
| 5,231,539 A * | 7/1993 | McMillen | .............. | G02B 5/122 33/279 |
| 5,311,222 A * | 5/1994 | Buckley | ................. | G01C 15/02 356/4.01 |
| 5,392,521 A * | 2/1995 | Allen | ..................... | G02B 5/122 33/293 |
| 6,324,024 B1 * | 11/2001 | Shirai | .................. | G01C 15/002 356/4.01 |
| 7,946,074 B2 * | 5/2011 | Nemec | ..................... | F41G 1/01 42/113 |
| 2003/0123153 A1 * | 7/2003 | Ohtomo | .............. | G01C 15/004 359/618 |

FOREIGN PATENT DOCUMENTS

| | | |
|---|---|---|
| DE | 4025119 A1 | 2/1992 |
| WO | 2005012834 A1 | 2/2005 |

OTHER PUBLICATIONS

European Search Report for European Application No. EP14160655 dated Nov. 17, 2014.

* cited by examiner

*Primary Examiner* — Christopher Fulton
(74) *Attorney, Agent, or Firm* — McCormick, Paulding & Huber LLP

(57) ABSTRACT

In a surveying prism comprising a prism housing (12) for accommodating a prism element, which prism housing is pivotably mounted in a bracket about an axis that is oriented parallel to the light ingress surface of the prism element, the bracket is formed as a base comprising a base plate (16) which forms a support surface for the surveying prism (10), and two bearing flanges oriented perpendicular to said base plate, between which bearing flanges the prism housing (12) is pivotably mounted.

20 Claims, 3 Drawing Sheets

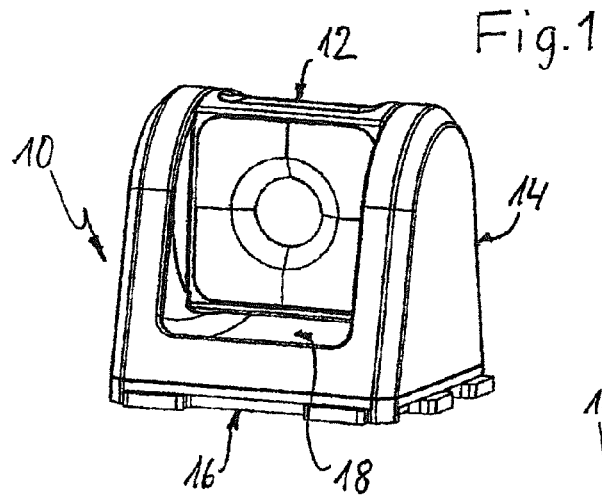
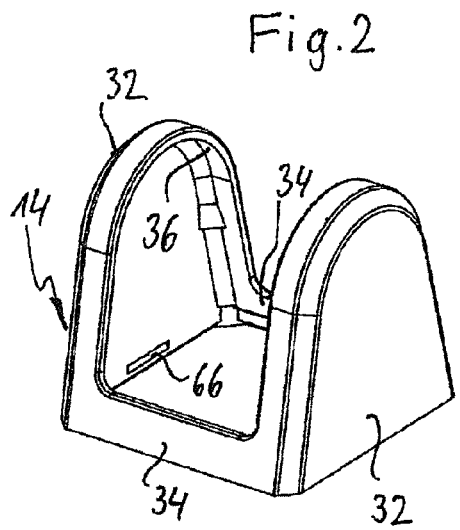
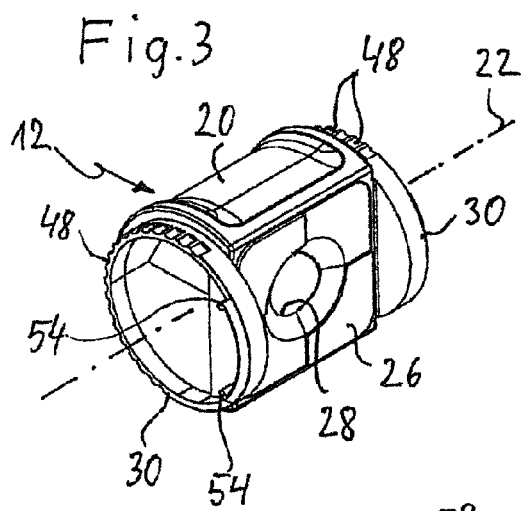
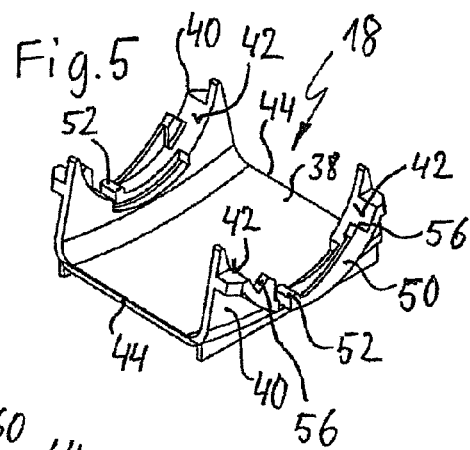
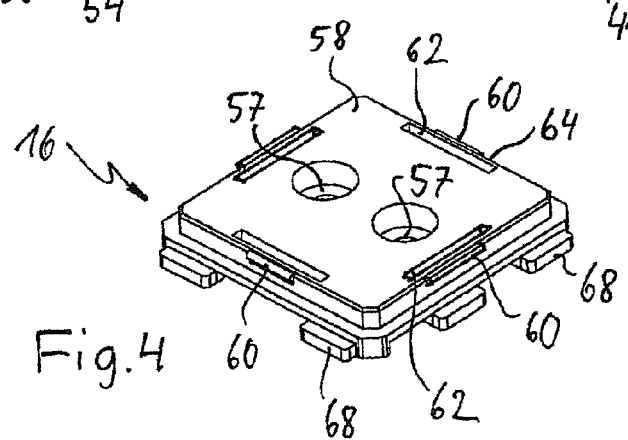

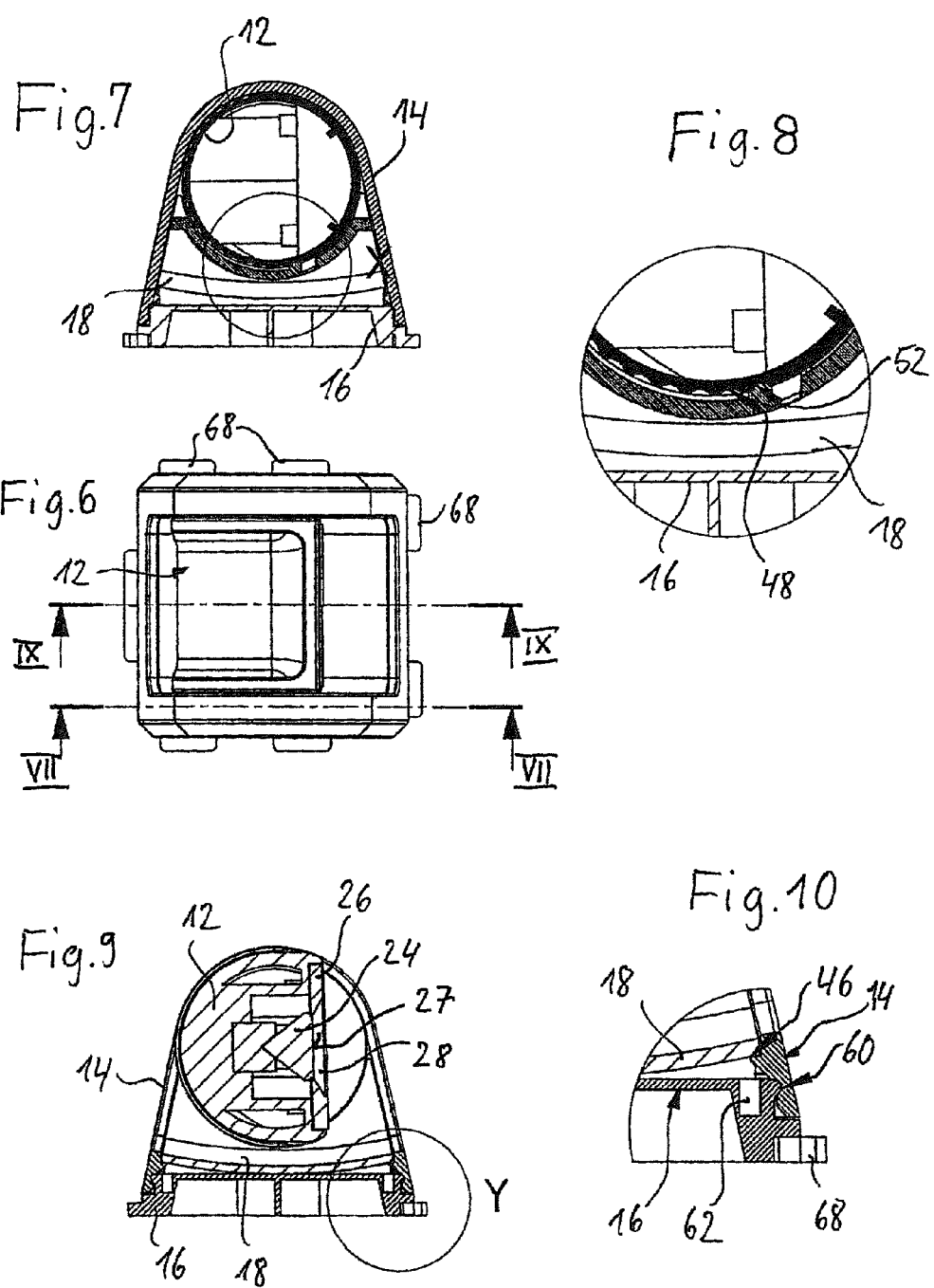

SURVEYING PRISM

CROSS REFERENCE TO RELATED APPLICATION

Applicant hereby claims foreign priority benefits under U.S.C. §119 from German Utility Model Patent Application No. 20 2013 101 924.0 filed on May 3, 2013, the contents of which are incorporated by reference herein.

TECHNICAL FIELD

The invention relates to a surveying prism comprising a prism housing for accommodating a prism element, said prism housing being pivotably mounted on a bracket about a pivot axis that is oriented parallel to the light ingress surface of the prism element.

BACKGROUND

In known surveying prisms of this type the bracket generally comprises a fork, between the arms of which the prism housing is pivotably mounted and can be fixed in a specific pivot position by means of screws. The fork comprises a rod-shaped shaft which either has a tip by means of which said shaft can be placed on a support, or which can be inserted into an adapter, which must in turn be fixed to a support. The entire structure is complex and expensive, and cumbersome to handle.

SUMMARY

The object of the invention is to specify a surveying prism of the type indicated in the introductory part which is simple and cost-effective to produce and to maintain and easy to handle and which offers a plurality of possible uses.

According to the invention, the object is attained by designing the bracket as a base comprising a base plate that forms a support surface for the surveying prism and two bearing flanges which are oriented perpendicular to said base plate and between which bearing flanges the prism housing is pivotably mounted.

The base comprising the base plate makes it possible to place the surveying prism onto a surface that is to be surveyed, to align said prism on the surface and to optionally fasten said prism to the surface. This can be accomplished either by means of screws that extend through the base plate or simply by gluing. This design facilitates substantially the handling of the surveying prism during the surveying process.

The bearing flanges are preferably part of a bearing frame which can be releasably connected to the base plate. The bearing frame is preferably adjustable relative to the base plate about an axis perpendicular to said base plate. For example, the bearing frame can be connected to the base plate in at least two different positions which are offset against each other about an axis that is perpendicular to the base plate. This embodiment not only facilitates the assembly of the surveying prism but also offers the possibility of modifying the orientation of the surveying prism when the base plate is already fastened. The two positions are preferably offset against each other by 90 degrees. The releasable connection of the base plate to the bearing frame can be accomplished by releasable catch means.

In a preferred embodiment, bearing rings are formed at the axial ends of the prism housing, wherein on the surfaces of the bearing flanges that face each other, bearing shells that are open toward the base plate are formed for receiving the bearing rings, and wherein tension means are provided for retaining the bearing rings in the bearing shells. This embodiment can be easily produced and facilitates a fast and convenient assembly of the prism housing in the bearing frame. The tension means can, for example, comprise a cover plate that can be releasably connected to the bearing frame, which cover plate, at its connection point, contacts the prism housing and thus retains the housing in the bearing shells. At the same time, the cover plate covers the opening, through which the prism housing was introduced into the bearing frame. Advantageously, specific partial bearing shells are formed on the cover plate for abutment against the bearing rings, so that a bearing for the bearing rings is formed which is at least approximately closed.

In order to be able to securely hold the prism housing with the prism element in a specific pivoting position, it is advantageous if spring catch means are formed on both the cover plate and the prism housing, which spring catch means define a plurality of catch points, in which the prism housing can be fixed relative to the base. Advantageously, the pivot angle of the prism housing is delimited by end stops, with the total pivot angle of the prism housing measuring at least 180 degrees.

The spring catch means can be designed, for example, as ball catches, the balls of which can be pre-tensioned by separate springs in corresponding recesses. However, a particularly cost-effective solution provides that the spring catch means include a springy catch tongue comprising a catch nose formed on the cover plate or the prism housing and a plurality of catch recesses intended for reception to receive the catch nose, which catch recesses are mounted on the prism housing or the cover plate along the pivoting range of the prism housing. Such a catch tongue comprising the part supporting said tongue can be produced in a single work process. A separate assembly of the catch means can be omitted.

Advantageously, the prism housing has the form of a cylinder between the bearing rings, which cylinder is cut parallel to the cylinder axis that coincides with the pivot axis, wherein the cut surface contains a receiving opening for the prism element.

All the parts of the prism housing and the base can be produced from plastic material and assembled without the help of tools because of the catch connections. Thereby, a surveying prism can be obtained which is easy to produce and cost effective, and which furthermore is easy to handle.

BRIEF DESCRIPTION OF THE DRAWINGS

Further features and advantages of the invention result from the further sub-claims and the following description, which in conjunction with the drawings attached describes the invention on the basis of an exemplary embodiment. The drawings show:

FIG. 1 is a partial schematic perspective overall view of the prism according to the invention, FIG. 2 is a perspective view of the bearing frame alone, FIG. 3 is a perspective view of the prism housing alone, FIG. 4 is a perspective view of the base plate alone, FIG. 5 is a perspective view of the cover plate holding the prism housing in the bearing frame alone, FIG. 6 is a plan view of the surveying prism shown in FIG. 1

FIG. 7 is a cross-sectional view of the surveying prism along FIG. VII-VII in FIG. 6, FIG. 8 is an enlarged representation of the detail X in FIG. 7, FIG. 9 is a cross-sectional view of the surveying prism along line IX-IX in FIG. 6, FIG. 10 is an enlarged view of the detail Y in FIG. 9, FIGS. 11 and 12 show portions of the base plates of two surveying prisms arranged next to each other

DETAILED DESCRIPTION

Figure 11:
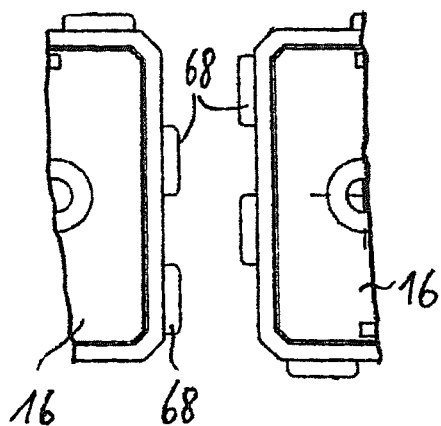

FIG. 1 shows a surveying prism according to the invention, generally designated as 10, the essential individual parts being represented in FIG. 2 to 5. The surveying prism 10 thus comprises a prism housing that is generally designated as 12, said housing being pivotably mounted in a bearing frame 14, which can in turn be connected to a base plate 16 and which, together with said base plate, forms a base for the prism housing 12. The prism housing 12 is held in the bearing frame 14 by means of a cover plate 18. The individual parts indicated above shall now be described in more detail:

The prism housing 12 is drum-shaped with a partially cylindrical circumferential surface 20, the cylinder axis or curvature axis of which coincides with the pivot axis 22 of the prism housing 12. The cylinder thus formed is cut parallel to the axis thereof. The cut surface contains an opening, into which a prism element 24 (FIG. 9) is inserted, the position of which is secured in the prism housing 12 by means of a retaining frame 26 having an opening 28 which uncovers a light ingress surface 27 of the prism element 24.

The prism housing 12 has a bearing ring 30 at each axial end thereof. By means of said bearing rings 30 the prism housing 12 is pivotably mounted in the bearing frame 14, which is formed by two bearing flanges 32 that are parallel to one another and connected to each other by means of webs 34. On the inner surfaces of the bearing flanges 32, which face each other, bearing shells 36 are formed, each of which is open towards the bottom and against which the bearing rings 30 abut, as it is shown in FIGS. 7 and 9. In this mounting position, the prism housing 12 is held by the cover plate 18 shown in FIG. 5. The cover plate comprises a center section 38 which closes off the bearing frame 14 towards the bottom, and two edge flanges 40. Said edge flanges 40 have partial bearing flanges 42 on their upper edges, which are intended for abutment against the bearing rings 30 of the prism housing 12 and which support said prism housing from below.

Once the prism housing 12 has been inserted from below into the bearing frame 14, which is open toward the bottom, up to the point at which the bearing rings 30 are located inside the bearing shells 36 of the bearing flanges 32, the cover plate 18 is likewise pushed into the bearing frame 14 from below, until it locks with the edges 44 of its center section 38 behind the catch noses 46 (FIG. 10) which are formed on the inner side of the bearing flanges 32. The bearing rings 30 of the prism housing 12 are thus enclosed by the bearing shells 36 on the bearing flanges 32 and the partial bearing shells 42 on the cover plate 18.

In order to hold the prism housing 12 in a specific pivot position relative to the bearing frame 14, catch means are provided. In the embodiment shown these comprise catch recesses 48 formed in the outer circumferential surface of the bearing rings 30 and catch tongues 50 which are integrally formed with the edge flanges 40 of the cover plate 18, each such tongue having at its unattached end a catch nose 52 intended for engagement into the recesses 48. Because the catch tongues 50 are connected to the respective edge flange 40 only at the end of said tongue that is distal from the respective catch nose 52, the catch tongues can be resiliently deflected in order to enable a rotation of the prism housing 12 relative to the bearing frame 14. At the same time, the spring effect of the catch tongues 50 ensures that the prism housing 12 is pushed against the bearing shells 36 of the bearing frame 14. The catch function between the catch tongues 50 and the recesses 48 in the bearing rings 30 is shown in more detail in FIG. 8.

Finally, end stops 54 are formed on the bearing rings 30, which end stops, in cooperation with counter stops 56 on the edge flanges 18, delimit the pivoting range of the prism housing 12 relative to the bearing frame 14.

The pre-assembled unit consisting of bearing frame 14, prism housing 12 and cover plate 18 is placed on the base plate 16 and connected to the latter by catch means. The base plate 16 according to FIG. 4 has a square design and comprises bores 57 for fastening screws to pass through, by means of which the base plate 16 can be screwed onto a support. The base plate 16 further comprises a stepped base 58, along the edges of which four catch ribs 60 are formed. In the region of the catch ribs 60 the base 58 has slits 62 which allow the catch ribs 60 to spring with the rest of the connector 64. When the bearing frame 14 is placed on the base plate 16, the catch ribs 60 engage into recesses 66 that are formed on the inner side of the bearing flanges 32. The interaction of catch means 60 to 66 is shown in more detail in FIG. 10. Because catch ribs 60 are provided on all four square sides of the base plate 16, the bearing frame 14 can be connected to the bottom plate 16 in two positions which are offset against each other by 90 degrees. This can be advantageous if the bottom plate has already been fastened to a support and the position of the prism housing 12 will be retroactively adjusted for surveying from another direction.

Figure 12:
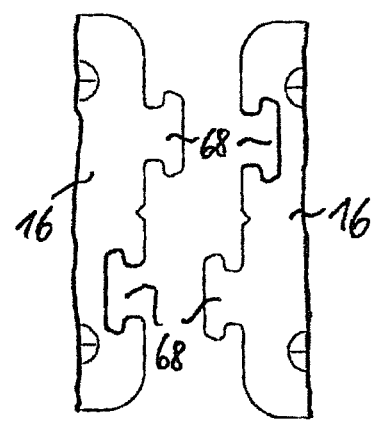
Figure 13:
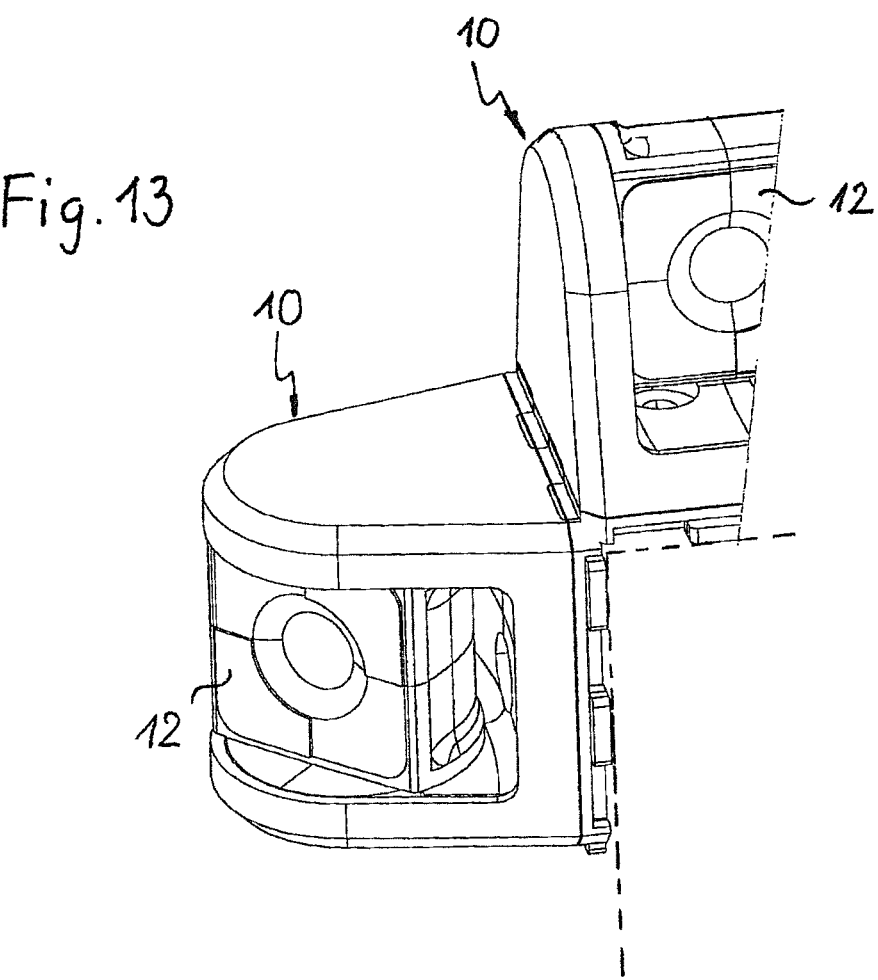
FIG. 13 is a partial schematic representation of two surveying prisms according to the invention, which are arranged along the edge of an object.

Along the outer edges of the bottom plate 16 coupling elements 68 are provided, by means of which two surveying prisms that are arranged next to one another can be precisely aligned with each other. This allows an arrangement comprising several surveying prisms to be assembled, which prisms can be aimed from different directions while at the same time a common reference point can be precisely established. The surveying prisms in this case are moved towards one another in the manner shown in FIG. 11 until they abut against one another and the coupling elements 68 interlock. FIG. 12 shows an embodiment in which the coupling elements have a T-shaped profile and can be inserted one into the other in such a way that the base plates of the surveying prisms adjacent to each other are fixedly connected together. A corresponding assembly of two surveying prisms at an angle is also possible, e.g., along a building corner edge, as shown in FIG. 13. This arrangement also allows the surveying prisms to be aimed from different directions, wherein a common reference point can be clearly defined.

The description above shows that the surveying prism according to the invention has a very simple construction and is easy to assemble and can be mounted without additional adapters or the like on a surface of an object to be surveyed. The prism housing can be comfortably adjusted, while the compact, closed design ensures that the susceptibility to soiling of the surveying prism is relatively low, even under rough conditions. Due to its low production costs, the surveying prism described above is likewise suitable for use in large numbers along bridges, tunnels and the like.

While the present invention has been illustrated and described with respect to a particular embodiment thereof, it should be appreciated by those of ordinary skill in the art that various modifications to this invention may be made without departing from the spirit and scope of the present.

What is claimed is:

1. A surveying prism comprising a prism housing accommodating a prism element, which housing is pivotably mounted in a bracket about an axis that is oriented parallel to the light ingress surface of the prism element, wherein the bracket is formed as a base comprising a base plate that forms the support surface of the surveying prism and two bearing flanges oriented perpendicularly to said base plate, wherein the prism housing is pivotably mounted between the two bearing flanges, wherein the bearing flanges are part of a bearing frame, which is releasably connected to the base plate, wherein the base plate has at least two faces, and edges that are in between the at least two faces, and wherein the base plate has coupling elements on at least one of these edges for a releasable connection to the base plate of a surveying prism of similar design.

2. The surveying prism according to claim 1, wherein the bearing frame is configured to be connected to the base plate in at least two different positions which are offset against each other about an axis that is perpendicular to the base plate.

3. The surveying prism according to claim 2, wherein the two positions of the bearing frame are offset against each other by 90 degrees relative to the base plate.

4. The surveying prism according to claim 3, wherein the base plate is configured to be connected to the bearing frame by releasable catch means.

5. The surveying prism according to claim 2, wherein the base plate is configured to be connected to the bearing frame by releasable catch means.

6. The surveying prism according to claim 2, wherein the base plate has coupling elements on at least one of its edges for a releasable connection to the base plate of a surveying prism of similar design.

7. The surveying prism according to claim 1, wherein the base plate is configured to be connected to the bearing frame by releasable catch means.

8. The surveying prism according to claim 1, wherein bearing rings are formed at the axial ends of the prism housing, in that bearing shells, which are open towards the base plate and are intended for receiving the bearing rings, are formed on the surfaces of the bearing flanges that face each other, and in that tension elements for retaining the bearing rings in the bearing shells are provided.

9. The surveying prism according to claim 8, wherein the tension means comprise a cover plate that is configured to be releasably connected to the bearing frame, which cover plate, at its connection point, contacts the prism housing.

10. The surveying prism according to claim 9, wherein on the cover plate specific partial bearing shells are formed for abutment against the bearing rings.

11. The surveying prism according to claim 9, wherein spring catch means are formed on both the cover plate and the prism housing, which catch means define a plurality of catch positions which permit the prism housing to be fixed relative to the base.

12. The surveying prism according to claim 11, wherein the spring catch means comprise at least one springy catch tongue having a catch nose, formed on the cover plate or the prism housing, and a plurality of catch recesses for receiving the catch nose, which catch recesses are formed on the prism housing and/or the cover plate along the pivoting range of the prism housing.

13. The surveying prism according to claim 9, wherein the cover plate is configured to be connected to the bearing frame by releasable catch means.

14. The surveying prism according to claim 8, wherein the prism housing has the form of a cylinder between the bearing rings, which cylinder is cut parallel to the cylinder axis that coincides with the pivot axis, wherein the cut surface contains a receiving opening for the prism element.

15. The surveying prism according to claim 14, wherein the receiving opening is covered by a retaining frame.

16. The surveying prism according to claim 1, wherein the pivot angle of the prism housing is delimited by end stops.

17. The surveying prism according to claim 1, wherein the pivot angle of the prism housing measures at least 180 degrees.

18. The surveying prism according claim 1, wherein the base plate has coupling elements on at least one of its edges for a releasable connection to the base plate of a surveying prism of similar design.

19. A surveying prism comprising a prism housing accommodating a prism element, which housing is pivotably mounted in a bracket about an axis that is oriented parallel to the light ingress surface of the prism element, wherein the bracket is formed as a base comprising a base plate that forms the support surface of the surveying prism and two bearing flanges oriented perpendicularly to said base plate, wherein the prism housing is pivotably mounted between the two bearing flanges, wherein the base plate has at least two faces, and edges that are in between the at least two faces, and wherein the base plate has coupling elements on at least one of these edges for a releasable connection to the base plate of a surveying prism of similar design.

20. A surveying prism comprising a prism housing accommodating a prism element, which housing is pivotably mounted in a bracket about an axis that is oriented parallel to the light ingress surface of the prism element, wherein the bracket is formed as a base comprising a base plate that forms the support surface of the surveying prism and two bearing flanges oriented perpendicularly to said base plate, wherein the prism housing is pivotably mounted between the two bearing flanges, and wherein the bearing flanges are part of a bearing frame, which is releasably connected to the base plate in a rotatably fixed manner via at least two releasable connections.

* * * * *